(12) United States Patent
Legendre

(10) Patent No.: US 9,732,897 B2
(45) Date of Patent: Aug. 15, 2017

(54) SEALING DEVICE FOR CONNECTING TWO PIPES

(75) Inventor: Christophe Legendre, Virandeville (FR)

(73) Assignee: Electricite de France, Paris (FR)

( * ) Notice: Subject to any disclaimer, the term of this patent is extended or adjusted under 35 U.S.C. 154(b) by 513 days.

(21) Appl. No.: 13/808,557

(22) PCT Filed: Jul. 7, 2010

(86) PCT No.: PCT/IB2010/002033
§ 371 (c)(1),
(2), (4) Date: Jan. 4, 2013

(87) PCT Pub. No.: WO2012/004653
PCT Pub. Date: Jan. 12, 2012

(65) Prior Publication Data
US 2013/0106096 A1    May 2, 2013

(51) Int. Cl.
| | |
|---|---|
| *F16L 55/10* | (2006.01) |
| *E21B 43/01* | (2006.01) |
| *F16L 1/26* | (2006.01) |
| *F16L 55/165* | (2006.01) |
| *F16L 55/18* | (2006.01) |

(52) U.S. Cl.
CPC ...... *F16L 55/1018* (2013.01); *E21B 43/0122* (2013.01); *F16L 1/26* (2013.01); *F16L 55/1022* (2013.01); *F16L 55/1657* (2013.01); *F16L 55/18* (2013.01)

(58) Field of Classification Search
CPC ............... F16L 55/1018; F16L 55/1022; F16L 55/02709; F16L 55/44; F16L 55/40; F16L 55/28; F16L 55/10; F16L 2101/40; F16L 27/12; F16L 27/0816; F16L 27/082; F16L 27/0804; F16L 27/0808; F16L 11/26; F16L 37/413; F16L 29/02; F16L 1/26; F16L 55/18; F16L 55/1657; E21B 43/0122; E21B 33/126; E21B 33/127
USPC ................................. 285/302, 95; 166/135
See application file for complete search history.

(56) References Cited

U.S. PATENT DOCUMENTS

| | | | | |
|---|---|---|---|---|
| 2,969,839 | A | * | 1/1961 | Greene ........................... 166/63 |
| 4,648,626 | A | | 3/1987 | Vinciguerra et al. |
| 4,894,115 | A | | 1/1990 | Eichelberger et al. |
| 5,678,635 | A | * | 10/1997 | Dunlap ................... E21B 23/01 |
| | | | | 166/123 |
| 7,422,071 | B2 | * | 9/2008 | Wilkie ................ E21B 33/1208 |
| | | | | 166/179 |

(Continued)

*Primary Examiner* — Gregory Binda
*Assistant Examiner* — Zachary Dragicevich
(74) *Attorney, Agent, or Firm* — Drinker Biddle & Reath LLP

(57) ABSTRACT

A sealing device is provided suitable for making at least partially fluid-tight a connection between a first pipe and a smaller second pipe, a part of the second pipe being able to be engaged in the first pipe while leaving an inter-pipes space between the two pipes in the radial direction. The sealing device is mounted on a supporting pipe and is adapted to spread out in the inter-pipes space from a guard position to a sealing position. It comprises at least one sealing set including substantially rigid movable sealing members which extend each along a predetermined angular sector in a circumferential direction and are individually guided in displacement between the guard position and the sealing position.

25 Claims, 5 Drawing Sheets

(56) References Cited

U.S. PATENT DOCUMENTS

2007/0261863 A1\* 11/2007 MacLeod ............ E21B 33/1216
  166/387
2009/0308592 A1\* 12/2009 Mercer .................. E21B 23/06
  166/134
2010/0024894 A1    2/2010 Himmelmann et al.
2012/0125472 A1\* 5/2012 Pinkalla et al. ............ 138/96 R \* cited by examiner

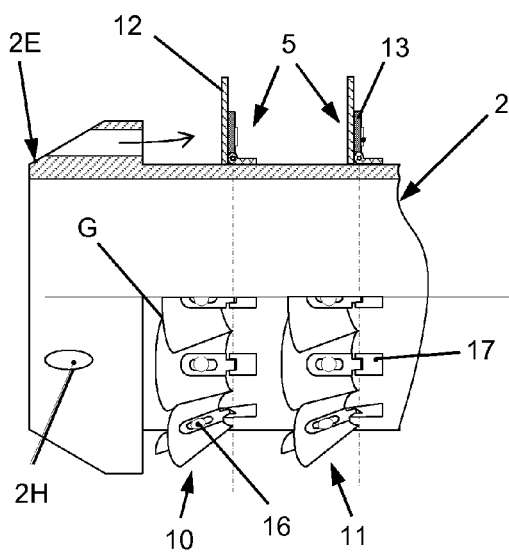
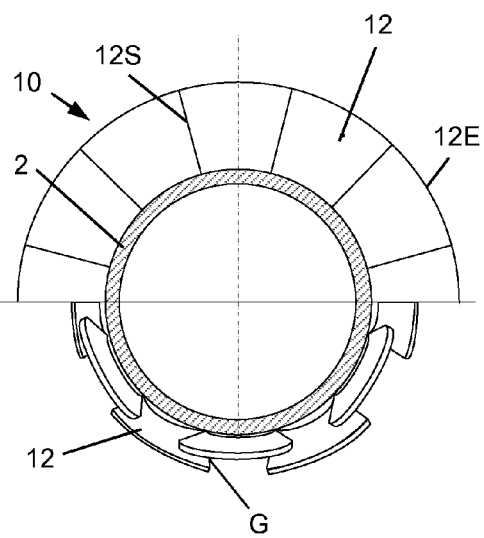
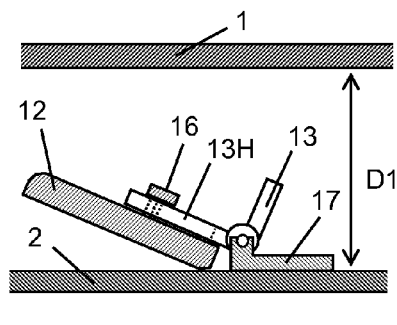
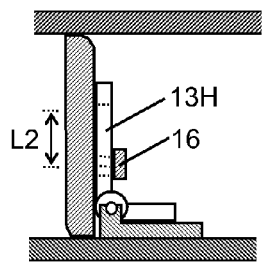
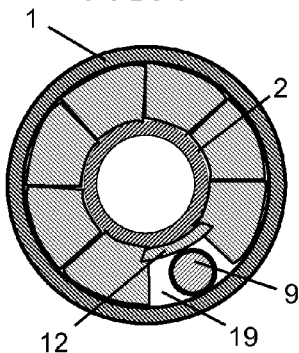
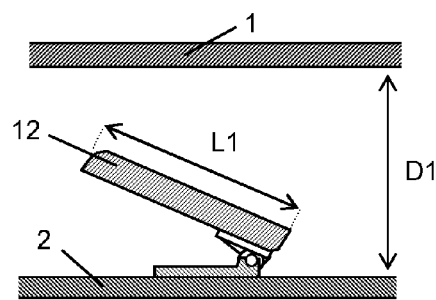
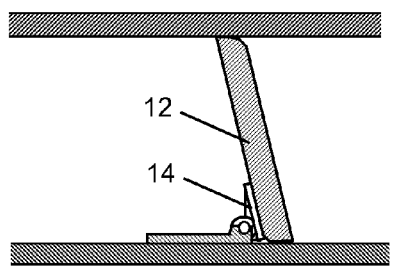

SEALING DEVICE FOR CONNECTING TWO PIPES

CROSS-REFERENCE TO RELATED APPLICATION

This application is the U.S. national phase of International Patent Application No. PCT/IB2010/002033 filed Jul. 7, 2010, the entire content of which is incorporated herein by reference.

FIELD

The invention relates to a sealing device for making at least partially fluid-tight a connection between a first pipe having a predetermined inside diameter and a second pipe having an outside diameter smaller than said inside diameter of the first pipe, a part of the second pipe extending in a longitudinal direction and being able to be engaged in the first pipe while leaving an inter-pipes space between the two pipes in the radial direction, the sealing device being mounted on a supporting pipe which is one of the first and second pipes and being adapted to spread out in said inter-pipes space from a guard position to a sealing position;

BACKGROUND

Such type of sealing device is found for example in U.S. Pat. No. 4,648,626A which describes a telescopic joint for underwater pipelines, comprising an inner pipe provided with an expandable steel sheath. A gap is created between the steel sheath and an inner cylinder forming an end part of the inner pipe, and is connected to pressure means so that applying pressure in the gap causes the steel sheath to deform and to expand in order to interlock with an outer pipe. To maintain a sealing pressure of contact between the sheath and the outer pipe for a long time, the fluid injected in the gap can be an epoxy resin which solidifies to obtain a permanently deformed sheath. However, injecting a resin under pressure may be difficult, especially in underwater conditions where water pressure is high.

Furthermore, the deformation ability of the steel sheath is not high, therefore the outer diameter of the sheath before expansion cannot be significantly lower than the inner diameter of the outer pipe and consequently the radial length of the inter-pipes space is necessarily small. The device is disadvantageous in a configuration in which the inner pipe has to be introduced and guided into the outer pipe and the guidance conditions are difficult, for instance in case of an alignment shift between the outer pipe and a telescopic inner pipe when introducing the inner pipe.

SUMMARY

To mitigate those drawbacks, and in particular to seal larger inter-pipes space than with the above mentioned prior art device, the invention provides a sealing device of the kind in question comprising at least one sealing set including substantially rigid movable sealing members which extend each along a predetermined angular sector in a circumferential direction and are individually guided in displacement between said guard position and said sealing position.

By means of these dispositions, a relatively large spread out amplitude of the sealing device between the guard position and the sealing position can be obtained, compared to the prior art device of U.S. Pat. No. 4,648,626A. Moreover, as the movable sealing members of a sealing set are individually guided in displacement, at least one sealing member may be impeded to spread out without impeding the other sealing members to reach their sealing positions. This allows to substantially seal an inter-pipes space in which a remaining element stays which hinders a complete spread out of one sealing member, and to obtain an incomplete sealing which can be however acceptable if most of the inter-pipes space cross section is covered by the sealing members of a sealing set. For instance, if the remaining element is a drill pipe which remains inside a broken leaking pipeline, the sealing device may be mounted on a pipe to be introduced inside the leaking end of the pipeline and may seal up to about 95% of the leak in the sealing position.

In embodiments of a sealing device according to the invention, the sealing device comprises one or more of the following dispositions:

in the guard position of a said sealing set, several sealing members overlap each other and leave inter-blade spaces between themselves through which a fluid coming from one of said two pipes can pass, which allows some fluid to pass through a first sealing set and to exert a pressure against a second sealing set in order to displace said second sealing set to its sealing position;

in the sealing position of a sealing set, several sealing members extend in a plane perpendicular to a longitudinal axis of the supporting pipe, and these sealing members have side edges extending in a radial direction, which allows to have relatively small sized sealing members;

at least one sealing member is mounted to slide on a guidance ramp which is arranged so that said sealing member moves away from said supporting pipe when it is displaced towards said sealing position, which allows notably to rigidly link with each other two longitudinally aligned sealing members of two subsequent sealing sets in order to form movable pairs of sealing members so that the two subsequent sealing sets spread out simultaneously;

in the sealing position of a sealing set, several sealing members form an generally tapered arrangement, said sealing members having a length which is greater than a radial length of said inter-pipes space, which is advantageous to avoid breaking the sealing device in the sealing position and to facilitate withdrawal of the second pipe from the first pipe if disassembling of the sealing device is needed;

in said sealing position, several sealing members overlap and cover each other in a significantly fluid-tight manner, which is advantageous to enhance the compactness of a sealing set in the guard position;

at least one said sealing member is arranged so that its displacement to the sealing position is performed at least partly thanks to the pressure exerted on said sealing member by a fluid circulating in at least one of said first and second pipes, which allows to avoid or to limit the use of a specific energized actuation device dedicated to spread out a sealing set;

the sealing device comprises two sealing sets substantially identical and spaced one another in the longitudinal direction, which may enhance the overall sealing efficiency;

at least said sealing member is a sliding sealing member mounted sliding along a first pivoting arm according to a predetermined travel, said first pivoting arm being adapted to pivot in a plan which contains a longitudinal axis of the supporting pipe, which enhances the folding ability of the sealing members and therefore the compactness of a sealing set in the guard position;

a sealing set includes an alternation of said sliding sealing members and of non-sliding sealing members which are secured to second pivoting arms, which reduces the number of sliding sealing members and may lower the manufacturing costs;

in said guard position, said sealing members are prevented to be displaced towards said sealing position thanks to a retaining device which comprises a retaining member surrounding at least one said sealing set, said retaining device further comprising releasing means able to release said retaining member so as to allow said sealing members to be displaced towards said sealing position, which provides a simple solution to retain the sealing set in the guard position.

The invention also provides a telescopic connection module comprising an enclosure and a telescopic tube in communication with an inner space of the enclosure, the telescopic tube being movable in translation between a rearward position and a forward position and comprising a front portion provided with a sealing device according to the invention. By means of these dispositions, a telescopic connection module, for instance an underwater transportable module, is provided with a telescopic tube able to be connected to a stationary pipe, for instance an underwater broken and leaking pipeline, in order to canalize the leaking oil into the module and to collect the oil via an output pipe connected to the module.

In embodiments of a telescopic connection module according to the invention, the telescopic connection module comprises one or more of the following dispositions:

the telescopic connection module comprises an actuation mechanism provided with pivoting rods adapted to actuate the telescopic tube, said actuation mechanism being arranged in the enclosure and comprising a toggle lever able to lock the forward position of the tube;

the telescopic connection module comprises at least one guiding arm hinged to the enclosure, said guiding arm being adapted to come in contact with a pipe to be connected to the module and to position said pipe at least approximately in axis alignment with a longitudinal axis of the telescopic tube.

the enclosure comprises at least one output conduct suitable to allow that some incoming liquid coming into the enclosure through said telescopic tube leaves the enclosure through the output conduct.

BRIEF DESCRIPTION OF THE DRAWINGS

Other characteristics and advantages of the invention appear from the following detailed description of one embodiment thereof, given as a non limitative example and with reference to the accompanying drawings, in which:

FIG. 3 is a partial side view of a sealing device according to the first embodiment of the invention, the device being mounted on the telescopic tube of the connection module of FIG. 1, viewed both in longitudinal cut and side perspective;

FIG. 4 is a front view of a sealing set of the sealing device of FIG. 3, the sealing members being viewed both in the guard position and in the sealing position;

FIG. 5 is a partial side view of a sliding sealing member mounted sliding along a first pivoting arm, represented in the guard position;

FIG. 6 is a view of the sliding sealing member of FIG. 5, represented in the sealing position;

FIG. 7 is a front view of a sealing set of the sealing device of FIG. 3, represented in the sealing position to seal the broken pipe of FIG. 2 which includes a small drill pipe;

FIG. 8 is a partial side view of a sealing member mounted secured to a second pivoting arm, represented in the guard position;

FIG. 9 is a is a view of the sealing member of FIG. 8, represented in the sealing position;

DETAILED DESCRIPTION

Figure 1:
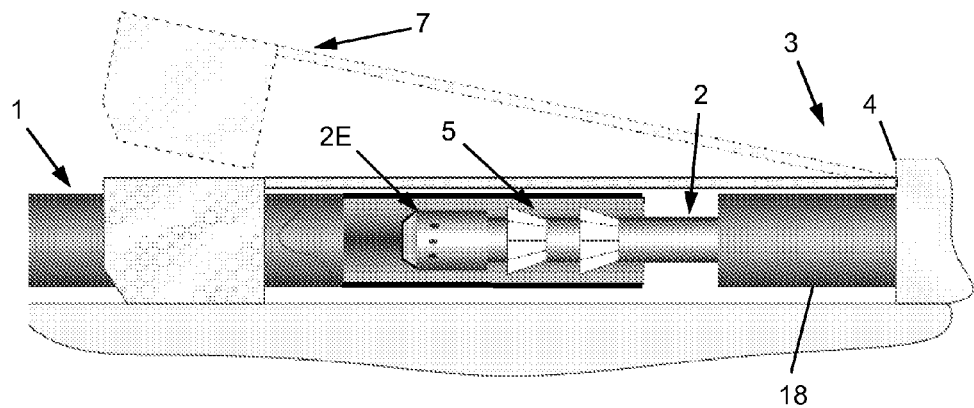
FIG. 1 is a schematic and partial side view of a telescopic connection module comprising a sealing device according to a first embodiment of the invention, disposed on the sea floor and being connected to a broken pipe carrying oil.
Figure 2:
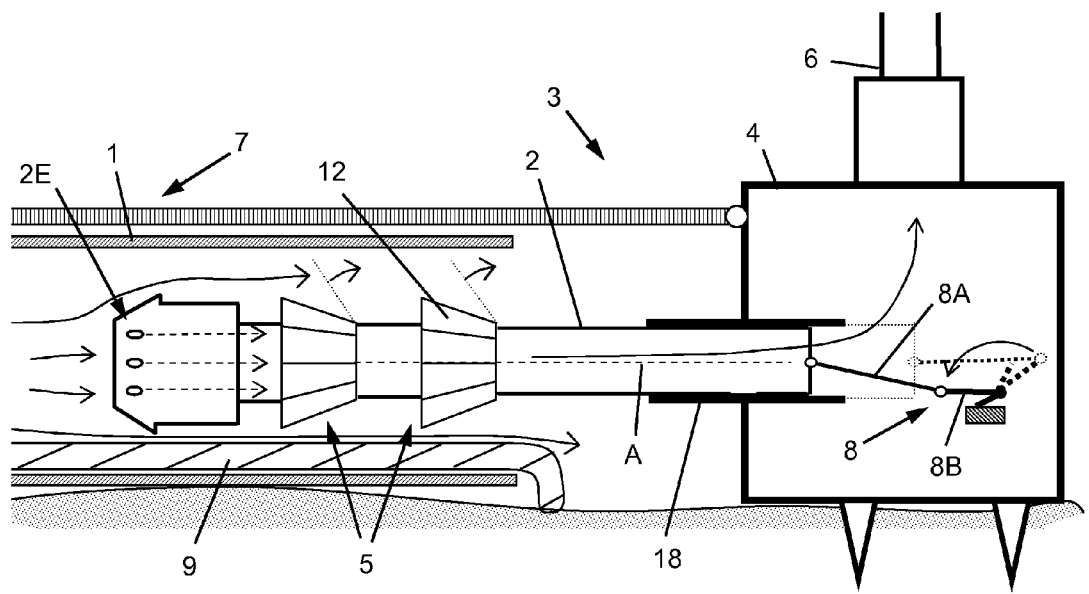
FIG. 2 is an enlarged schematic and partial side view of the telescopic connection module of FIG. 1 connected to a broken pipe which includes a small drill pipe.

As represented in FIGS. 1 and 2, a first embodiment of a telescopic connection module 3 comprising a sealing device 5 according to the invention is brought to be positioned in front of an open end of a first pipe 1 lying on the ocean floor, typically an accidentally broken pipe carrying oil which flows out through the open end. The connection module 3 comprises an enclosure 4 and a telescopic tube forming a second pipe 2 in communication with an inner space of the enclosure. The telescopic tube 2 is movable in translation along a longitudinal direction A between a rearward position and a forward position, and is represented in its forward position in which it is introduced inside the first pipe 1.

The telescopic tube 2 is able to slide along a tubular guide 18 secured to the enclosure 4 in a fluid-tight manner, and is operated by an actuation mechanism 8 provided with pivoting rods 8A and 8B (FIG. 2). The pivoting rod 8B consists in a toggle lever able to lock the forward position of the tube 2. The toggle lever 8B is in rotation abutment in said forward position of the tube 2, so that a rearward effort exerted on the tube 2 and applied to the pivoting rod 8A tends to maintain the toggle lever 8B in abutment.

A positioning guiding arm 7 is hinged to the enclosure 4 and adapted to come in contact with the pipe 1 to position the connection module 3 relatively to the pipe 1, so that the telescopic tube 2 is substantially in alignment with the pipe 1. A front portion of the telescopic tube 2 is provided with a sealing device 5 which comprises two sealing sets 10 and 11 substantially identical and spaced one another in the longitudinal direction, each sealing set including substantially rigid movable sealing members 12 (FIGS. 2 and 3). The second pipe 2 forms a supporting pipe for the sealing device 5. Each sealing member 12 extends along a predetermined angular sector in a circumferential direction and is individually guided in displacement between a guard position and a sealing position.

The first pipe 1 may include at least one smaller pipe, for instance a drill pipe 9 remaining in a bottom part of the pipe 1. The sealing device 5 is dimensioned to have an outer diameter in the guard position small enough so that the drill pipe 9 does not impede the device 5 to be introduced in the pipe 1. A front end portion 2E of the telescopic tube 2 can have a larger diameter than the above mentioned outer diameter and can be tapered, to facilitate introduction of the tube 2 while protecting the sealing device 5 in the guard position from radial shocks against the pipe 1.

As represented in FIG. 3, the front tapered end portion 2E of the telescopic supporting pipe 2 may comprise fluid passages 2H directing a fluid flow towards sealing members 12 of a front sealing set 10, so that the fluid pressure exerted on a sealing member 12 in the guard position by a fluid flow is able to pivot the sealing member to reach the sealing position when the sealing sets 10 and 11 are released. In the guard position, the sealing sets 10 and 11 each comprise sealing members 12 which overlap each other and leave inter-blade spaces G between themselves through which the fluid coming from the pipe 1 can pass. In this manner, some fluid passes through the front sealing set 10 so that a fluid pressure is also exerted on the rear sealing set 11, which may serve to spread out the latter.

As represented in FIGS. 3 and 4, the sealing members 12 are viewed both in a guard position and in a sealing position. More precisely, the top half parts of the drawings show the sealing sets 10 and 11 in the sealing position in which several or all sealing members 12 extend in a plane which is perpendicular to a longitudinal axis A of the supporting pipe 2. The sealing members have side edges 12S extending in a radial direction and which are in contact with each other in a fluid-tight manner. The length of a side edge 12S is equal to or slightly greater than the radial length of the inter-pipe space D1 between the two pipes 1 and 2. A distal edge 12E of a sealing member 12 is arc shaped with a radius sensibly equal to an inner radius of the first pipe 1.

The bottom half parts of the drawings show the sealing sets 10 and 11 in the guard position in which the sealing members 12 are pivoted about individual axis mounted on base members 17 which are secured to the supporting pipe 2. The outer diameter of a sealing set is minimized in the guard position.

As represented in FIGS. 3 to 6, the sealing members 12 are sliding sealing members each mounted sliding along a first pivoting arm 13 according to a predetermined travel L2. A first pivoting arm 13 is adapted to pivot on a corresponding base member 17, in a plane which contains the longitudinal axis A of the supporting pipe 2, and comprises an oblong hole 13H which is traversed by a sliding pin 16 secured to the corresponding sealing member 12. In this manner, a sealing member 12 slides along the corresponding first pivoting arm 13 between the guard position and the sealing position, to allow a proximal edge of the sealing member to come in sealing contact with the supporting pipe 2 in the sealing position.

As represented in FIG. 7, if a drill pipe 9 remains inside the pipe 1, the sealing device 5 can be adapted so that only one sealing member 12 of a sealing set 10 or 11 is substantially impeded by the drill pipe 9 to pivot. The angular sector of a sealing member 12 in the circumferential direction can be predetermined so that a non-sealed area 19 around the drill pipe 9 is relatively small and acceptable in view of the sealed area of the inter-pipe space.

Advantageously, the telescopic connection module 3 may comprise an angular positioning system to rotate the telescopic supporting pipe 2 about its longitudinal axis A in order to angularly position the sealing device relative to the drill pipe 9. In that case, it may be provided a gap in the circumferential direction between two consecutive sealing members of a sealing set 10 or 11, so that the drill pipe 9 fits into this gap when the sealing set is spread out with all sealing members being pivoted.

As represented in FIGS. 8 and 9, a non-sliding sealing member is secured to a second pivoting arm 14 and has a length L1 which is slightly greater than the radial length D1 of the inter-pipes space. In an embodiment of the sealing device 5, each sealing set 10 and 11 includes an alternation of sliding sealing members and of non-sliding sealing members. The sliding sealing members of a sealing set can be like those represented in FIGS. 10 and 11, and can have substantially the same length L1 as the non-sliding sealing members. They can be positioned for instance shifted forward relative to the non-sliding sealing members of the set. The number of sliding sealing members can be about the same as the number of non-sliding sealing members, which lowers the manufacturing costs since the non-sliding sealing members are easier to produce due to their simpler structure.

When the sealing members 12 have a length L1 which is greater than a radial length D1 of said the inter-pipes space, they form an generally tapered arrangement. A distal edge 12E of a sealing member 12 can be elliptically shaped in order to be in sealing contact with the inner surface of the first pipe 1. Most or all sealing members 12 can overlap each other in a significantly fluid-tight manner, somewhat like the tiles of a roof. This configuration is advantageous to avoid breaking the sealing device in the sealing position if some lateral efforts tend to incline one pipe relative to the other, because the sealing members can pivotally retract to reduce the strains applied on them. The ability of the sealing members to retract also facilitates withdrawal of the second pipe 2 from the first pipe 1 if disassembling of the pipe connection is needed.

Figure 10:
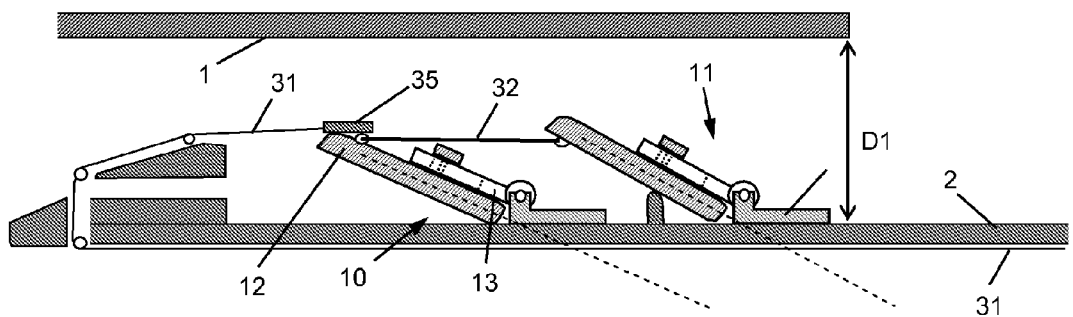
FIG. 10 is a partial side view of the sealing device according to a first embodiment of the invention, provided with a retaining device which is adapted to retain the sealing sets in the guard position.

As represented in FIG. 10, the sealing members 12 in the guard position are prevented to be displaced towards the sealing position thanks to a retaining device which comprises at least one retaining ring 35 surrounding the front sealing set. Both front and rear sealing sets 10 and 11 include an alternation of sliding sealing members able to slide on their pivoting support arms and of non-sliding sealing members. The non-sliding sealing members are not represented in the drawings, for sake of conciseness. Two retaining rings 35 may be used respectively for the sliding sealing members and the non-sliding sealing members of a same sealing set, in order to sequentially release the two kinds of sealing members and to decrease mutual friction between their overlapping edges when the sealing sets spread out.

Each sealing member of the rear sealing set is not strictly parallel to the corresponding front sealing member and is linked to the latter through a link cable extending sensibly in a longitudinal direction, so that the rear set is retained by the front set. Each link cable 32 is arranged so as to be slack in the sealing position represented in FIG. 11, to allow possible deviations of parallelism between the front and rear sealing members which ensures that a rear sealing member is applied with a sufficient pressure of contact against the inner surface of the pipe 1.

Figure 11:
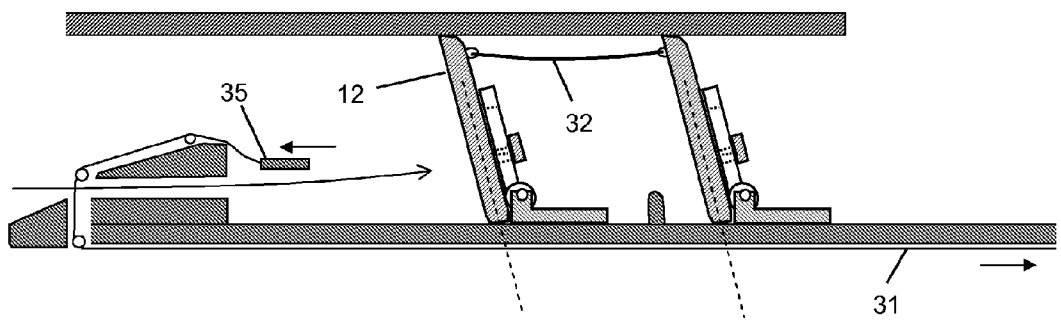
FIG. 11 is a partial side view of the sealing device of FIG. 10, in which the retaining device is removed so as to allow the sealing sets to spread out in the sealing position.

The retaining device further comprises at least one retaining cable 31 passing by pulleys, connected to the enclosure and able to be actuated to pull forward the retaining ring 35 so as to release the ring and to allow the sealing members 12 to be displaced in the sealing position, as represented in FIG. 11. Two retaining cables arranged diametraly on the telescopic second pipe 2 can be preferred to efficiently pull forward the retaining ring.

In an alternative embodiment not shown, two retaining rings with retaining cables extending rearwards could be provided respectively for the front and rear sealing sets. The retaining rings could be therefore easily re-positioned by a robot if the second pipe 2 and the sealing device represented in FIG. 11 have to be withdrawn from the first pipe 1 to be used again in another first pipe.

Figure 12:
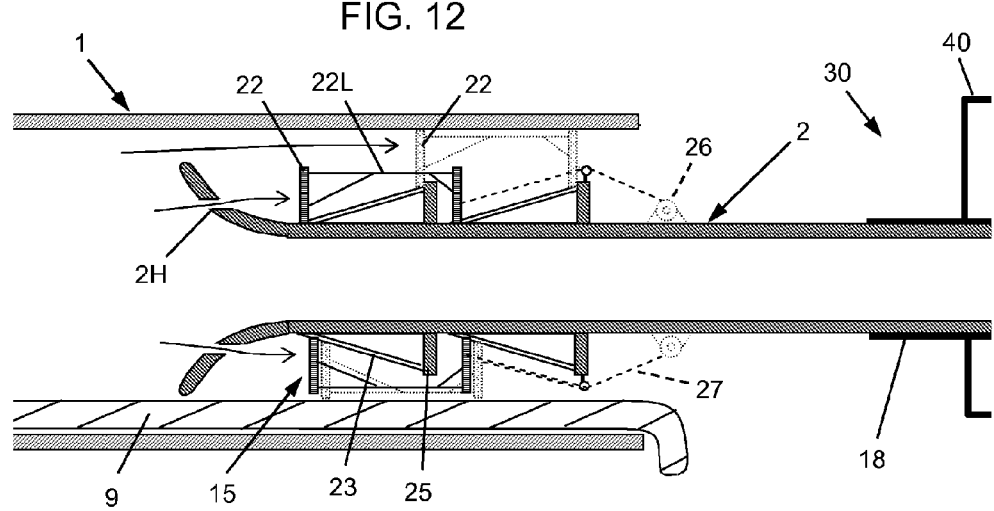
FIG. 12 is a schematic and partial side view of a telescopic connection module comprising a sealing device according to a second embodiment of the invention, disposed on the sea floor and being connected to a broken pipe carrying oil.

As represented in FIG. 12, a second embodiment of a telescopic connection module comprises a sealing device 15 according to a second embodiment of the invention. The connection module 30 can be also disposed on the sea floor, and is connected to a broken pipe 1 carrying oil. The sealing device 15 includes sealing members 22 which are mounted to slide on guidance ramps 23 secured to the supporting telescopic pipe 2. A guidance ramp 23 is dedicated to a single sealing member 22 and is arranged so that the sealing member moves away from the supporting pipe 2 when it is displaced towards its sealing position.

The sealing device 15 comprises two sets of respectively front and rear sealing members 22. Two longitudinally aligned sealing members 22 are rigidly linked to each other through a linking bar 22L so as to form a movable pair of sealing members which spread out simultaneously when rising along the respective guidance ramps 23. Therefore, the two sealing sets spread out simultaneously. The guidance ramps 23 of a sealing set are distributed in a circumferential direction and form a conical arrangement which bears on an annular sealing wall 25.

The displacement of the two sealing sets to the sealing position can be performed thanks to the pressure exerted on the sealing members of the front sealing set by the oil flowing out from the broken pipe 1. A front tapered end of the telescopic pipe 2 comprises apertures 2H adapted so that a flow of oil passing through said apertures exerts the needed pressure on the front sealing set, in order to displace the two sealing sets when a retaining device which can be analogue to the one of the first embodiment is released.

In all embodiments of a sealing device according to the invention, the displacement of a sealing set is not necessarily performed thanks to the sole pressure exerted by a fluid flowing out from a pipe. A mechanical device, for instance energized by at least one spring, can be used to perform at least a part of said displacement. As represented in FIG. 12, each pair of linked front and rear sealing members can be connected to a reel 26 through a cable 27 attached to the rear sealing member. The reel 26 exerts on the cable 27 a pulling force adapted to pull rearwards said pair of sealing members at least on a part of the displacement path to the sealing position which is represented in dash line. It can be noted that the fluid pressure on the sealing sets increases along the displacement path, as well as in the previous embodiment described in reference to FIGS. 10 and 11. Therefore, the pulling forces exerted by the reels 26 may be useful only for a first part of the displacement path.

Figure 13:
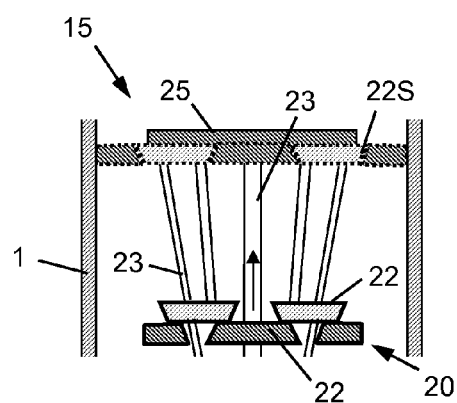
FIG. 13 is a schematic and partial top view of a sealing set of the sealing device of the connection module of FIG. 12, the sealing members being viewed both in the guard position and in the sealing position.

As represented in FIG. 13, the sealing members 22 of a front sealing set 20 are alternatively shifted in the longitudinal direction so that they overlap each other in the guard position, whereas they are adapted to be arranged in a same plane in the sealing position so as to be in sealing contact with the annular sealing wall 25. However, a plane arrangement in the sealing position is not necessary. A satisfactory sealing may be obtained also with overlapping sealing members, even though an adaptation of the annular sealing wall 25 would be needed. The sealing members of a rear sealing set 21 are alternatively shifted in the same manner.

Figure 14:
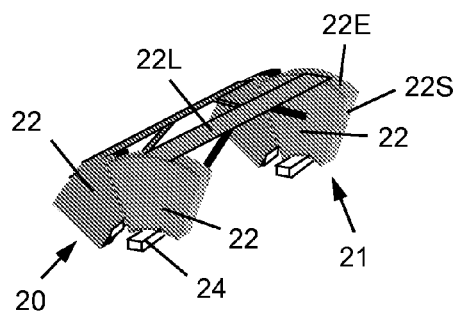
FIG. 14 is a schematic perspective view of two movable pairs of sealing members of two subsequent sealing sets of FIG. 13.

As represented in FIG. 14, a proximal edge of each sealing member 22 is provided with a guiding base member adapted to cooperate in a sliding manner with a corresponding guidance ramp 23. A distal edge 22E of a sealing member 22 is arc shaped with a radius equal to an inner radius of the first pipe 1. The sealing members have side edges 22S extending in a radial direction.

Figure 15:
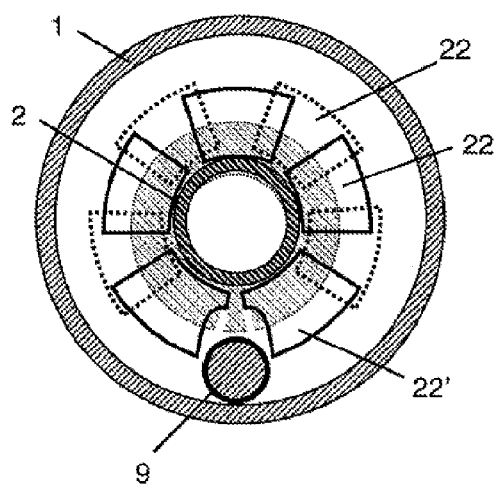
FIG. 15 is a front view of a sealing set of the sealing device of FIG. 12, represented in the guard position ready to seal the broken pipe.
Figure 16:
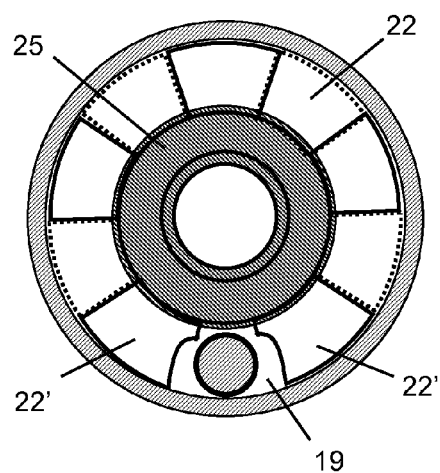
FIG. 16 is a front view of the sealing set of FIG. 15, represented in the sealing position.

As represented in FIG. 15, a sealing set 20 or 21 may comprise two sealing members 22' which have shapes being different from the shape of the sealing members 22, in order to provide a better sealing at the vicinity of a drill pipe 9 remaining in the first pipe 1. Each sealing member 22' has a concave side cut adapted so as to decrease the non-sealed area 19 around the drill pipe 9 in the sealing position, as represented in FIG. 16.

Figure 17:
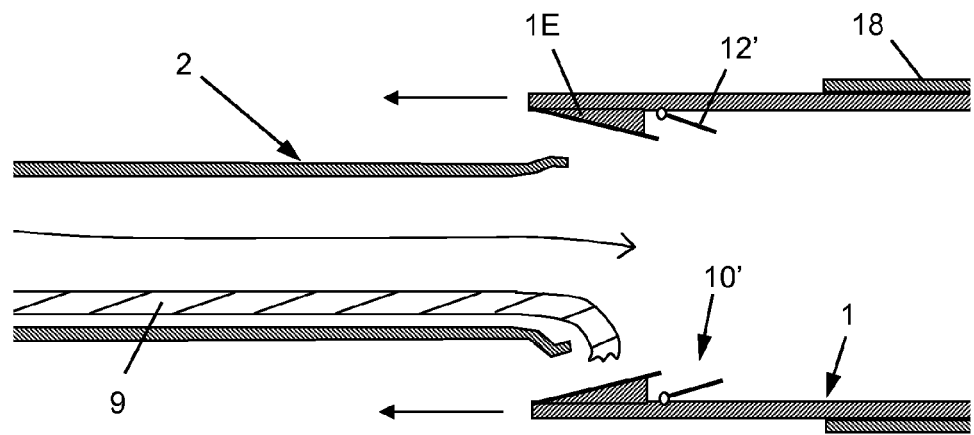
FIG. 17 is a schematic and partial side view of a telescopic connection module comprising a sealing device according to a third embodiment of the invention, the sealing device being mounted on the inside of a telescopic pipe which has an inner diameter larger than an outer diameter of a broken pipe to be sealed.

As represented in FIG. 17, a telescopic connection module may comprise a sealing device according to a third embodiment of the invention. The sealing device is mounted on the inside surface of a supporting telescopic pipe 1 which has an inner diameter larger than an outer diameter of a broken pipe 2 to be sealed. The sealing device comprises a sealing set 10' formed with pivoting sealing members 12' similar to the sealing members 12 in the first embodiment of the invention.

Figure 19:
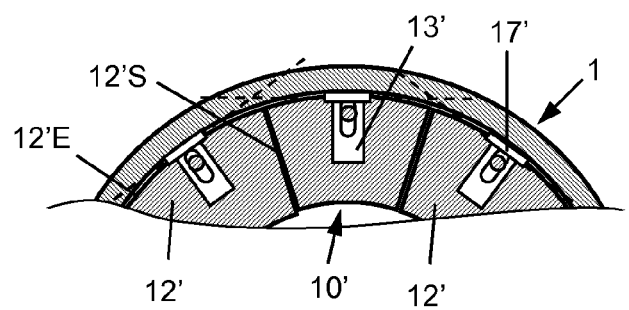
FIG. 19 is a front view of a sealing set of the sealing device of FIG. 17, represented in the sealing position.

As represented in FIG. 19, at least a part of the sealing members 12' are each mounted to slide along a dedicated pivoting arm 13' according to a predetermined travel, a pivoting arm 13' being adapted to pivot in a plan which contains a longitudinal axis of the telescopic pipe 1. The pivoting arms 13' are mounted on supports 17' which are secured to the inside surface of the supporting pipe 1, and have rotation axis which are coplanar in a plane perpendicular to said longitudinal axis. Of course, a part of the sealing members 12' can be mounted secured to dedicated second pivoting arms and overlap with adjacent sliding sealing members 12' in the sealing position, in the same manner as for the embodiment previously described in reference to FIGS. 8 and 9.

Figure 18:
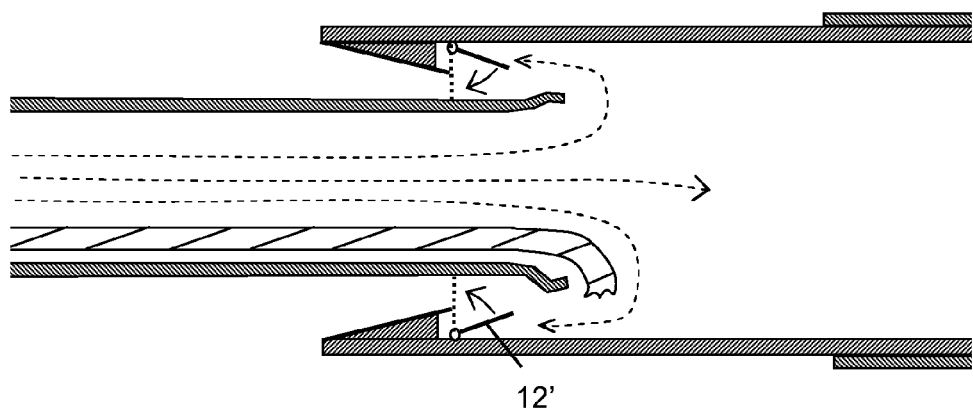
FIG. 18 is a schematic and partial side view of the telescopic connection module of FIG. 17, the sealing device being represented passing from the guard position to the sealing position.

As represented in FIG. 18, the sealing members 12' of the sealing device rotate from the guard position to the sealing position drawn in dash line thanks to the pressure of a fluid flowing out from the second pipe 2 inside the telescopic pipe 1. The connection module which supports the telescopic pipe 1, not represented, can be temporary closed except at the inlet of the telescopic pipe 1, in order to increase the fluid pressure exerted on the sealing set 10'. A front portion of the telescopic pipe 1 may comprise an inner tapered shield 1E adapted to guide and to protect the pipe 1 around the broken pipe 2 and which serves also as an abutment part for the sealing members 12' in the sealing position.

In any embodiment of a telescopic connection module according to the invention, the enclosure of the module may comprise at least one output conduct suitable to allow that some incoming liquid coming into the enclosure through the telescopic tube of the module leaves the enclosure through the output conduct. An output conduct 6 is represented in FIG. 2, which can be connected to a tanker ship to canalize to the tanker a major part the oil flowing out from the broken pipe 1.

In any embodiment of a sealing device according to the invention, the movable sealing members are substantially rigid but they may include edge parts made of a flexible material, for instance mounted at the arc shaped distal edges of the sealing members, in order to improve a sealing contact between an edge part and a broken pipe and/or the supporting pipe and/or an adjacent sealing member.

A telescopic connection module and a sealing device according to the invention are not suitable only for underwater environment, but can be used in any hostile environment where a device for connecting pipes in a sealed manner cannot be manually installed.

As will be appreciated, the present invention does not limit itself to the embodiments described here above purely as examples; the invention also extends to other embodiments covered by the claims.

The invention claimed is:

1. A sealing device for making at least partially fluid-tight a connection between a first pipe having a predetermined inside diameter and a second pipe having an outside diameter smaller than said inside diameter of the first pipe, a part of the second pipe extending in a longitudinal direction and being able to be engaged in the first pipe while leaving an inter-pipes space between the two pipes in the radial direction, the sealing device being adapted to be mounted on a supporting pipe which is one of the first and second pipes and being adapted to spread out in said inter-pipes space from a guard position to a sealing position, the sealing device comprising:
    at least one sealing set including substantially rigid movable sealing members which:
        extend each along a predetermined angular sector in a circumferential direction; and
        are individually and retractably guided in displacement between said guard position and said sealing position, and
    wherein each of the sealing members defines in the sealing position:
        a first sealing contact surface for sealing contact with the first pipe, and
        a second sealing contact surface for sealing contact with the second pipe,
    wherein at least one said sealing member is a sliding sealing member mounted sliding along a first pivoting arm according to a predetermined travel being adapted to pivot in a plane which contains a longitudinal axis of said supporting pipe, and
    wherein a said sealing set includes an alternation of said sliding sealing members and of non-sliding sealing members which are secured to second pivoting arms.

2. The sealing device according to claim 1, wherein in the guard position of a said sealing set, several sealing members overlap each other and leave inter-blade spaces between themselves through which a fluid coming from one of said two pipes can pass.

3. The sealing device according to claim 1, wherein in the sealing position of a said sealing set, several sealing members extend in a plane perpendicular to a longitudinal axis of said supporting pipe, and said sealing members have side edges extending in a radial direction.

4. The sealing device according to claim 1, wherein at least one said sealing member is mounted to slide on a guidance ramp which is arranged so that said sealing member moves away from said supporting pipe when it is displaced towards said sealing position.

5. The sealing device according to claim 1, wherein in the sealing position of a said sealing set, several of the sealing members form a generally tapered arrangement, said sealing members having a length which is greater than a radial length of said inter-pipes space.

6. The sealing device according to claim 5, wherein in said sealing position, several sealing members overlap and cover each other in a significantly fluid-tight manner.

7. The sealing device according to claim 1, wherein at least one said sealing member is arranged so that its displacement to said sealing position is performed at least partly thanks to the pressure exerted on said sealing member by a fluid circulating in at least one of said first and second pipes.

8. The sealing device according to claim 1, comprising two said sealing sets substantially identical and spaced one another in the longitudinal direction.

9. The sealing device according to claim 1, wherein in said guard position said sealing members are prevented to be displaced towards said sealing position thanks to a retaining device which comprises at least one retaining member surrounding at least one said sealing set, said retaining device further comprising releasing means able to release said retaining member so as to allow said sealing members to be displaced towards said sealing position.

10. A telescopic connection module, comprising an enclosure and a telescopic tube in communication with an inner space of said enclosure, said telescopic tube being movable in translation between a rearward position and a forward position and comprising a front portion provided with a sealing device according to claim 1.

11. The telescopic connection module according to claim 10, wherein said enclosure comprises at least one output conduct suitable to allow that some incoming liquid coming into the enclosure through said telescopic tube leaves the enclosure through said output conduct.

12. A telescopic connection module comprising:
    a sealing device for making at least a partially fluid-tight connection between a first pipe having a predetermined inside diameter and a second pipe having an outside diameter smaller than the inside diameter of the first pipe, a part of the second pipe extending in a longitudinal direction and being able to be engaged in the first pipe while leaving an inter-pipe space between the first piper and the second pipe in the radial direction;
    an enclosure;
    a telescopic tube in communication with an inner space of the enclosure, the telescopic tube forming the second pipe and being movable in translation between a rearward position and a forward position, and comprising a front portion provided with the sealing device;
    an actuation mechanism provided with pivoting rods adapted to actuate said telescopic tube, said actuation mechanism being arranged in said enclosure and comprising a toggle lever able to lock said forward position of the tube;
    wherein the sealing device is adapted to be mounted on a supporting pipe which is one of the first and second pipes and adapted to spread out in said inter-pipe spaces from a guard position to a sealing position, and wherein the sealing device comprises at least one sealing set including substantially rigid movable sealing members which extend each along a predetermined angular sector in a circumferential direction and are individually and retractably guided in displacement between said guard position and the sealing position.

13. The telescopic connection module according to claim 12, wherein the enclosure comprises at least one output conduct suitable to allow some incoming liquid coming into the enclosure through the telescopic tube to leave the enclosure through the output conduct.

14. A telescopic connection module comprising:
a sealing device for making at least a partially fluid-tight connection between a first pipe having a predetermined inside diameter and a second pipe having an outside diameter smaller than the inside diameter of the first pipe, a part of the second pipe extending in a longitudinal direction and being able to be engaged in the first pipe while leaving an inter-pipe space between the first pipe and the second pipe in the radial direction;
an enclosure;
a telescopic tube in communication with an inner space of the enclosure, the telescopic tube forming the second pipe and being movable in translation between a rearward position and a forward position, and comprising a front portion provided with the sealing device; and
at least one guiding arm hinged to said enclosure, said guiding arm being adapted to come in contact with a pipe to be connected to said module and to position said pipe substantially in axis alignment with a longitudinal axis of said telescopic tube;
wherein the sealing device is adapted to be mounted on a supporting pipe which is on of the first and second pipes, and adapted to spread out in the inter-pipe space from a guard position to a sealing position; and
wherein the sealing device comprises at least one sealing set including substantially rigid movable sealing members which extend each along a predetermined angular sector in a circumferential direction and are individually and retractably guided in displacement between said guard position and said sealing position.

15. The telescopic connection module according to claim 14, wherein the enclosure comprises at least one output conduct suitable to allow some incoming liquid coming into the enclosure through the telescopic tube to leave the enclosure through the output conduct.

16. A sealing device for making at least a partially fluid-tight connection between a first pipe having a predetermined inside diameter and a second pipe having an outside diameter smaller than said inside diameter of the first pipe, a part of the second pipe extending in a longitudinal direction and being able to be engaged in the first pipe while leaving an inter-pipes space between the first pipe and the second pipe in the radial direction, the sealing device being adapted to be mounted on a supporting pipe which is one of the first and second pipes and being adapted to spread out in said inter-pipes space from a guard position to a sealing position, comprising:

at least one sealing set including substantially rigid movable sealing members which extend each along a predetermined angular sector in a circumferential direction and are individually and retractably guided in displacement between said guard position and said sealing position, wherein at least one said sealing member is a sliding sealing member mounted sliding along a first pivoting arm according to a predetermined travel being adapted to pivot in a plan which contains a longitudinal axis of said supporting pipe, and wherein a said sealing set includes an alternation of said sliding sealing members and of non-sliding sealing members which are secured to second pivoting arms.

17. The sealing device according to claim 16, wherein in the guard position of a said sealing set, several sealing members overlap each other and leave inter-blade spaces between themselves through which a fluid coming from one of said two pipes can pass.

18. The sealing device according to claim 16, wherein in the sealing positions of a said sealing set, several sealing members extend in a plane perpendicular to a longitudinal axis of said supporting pipe, and said sealing members have side edges extending in a radial direction.

19. The sealing device according to claim 16, wherein at least one said sealing member is mounted to slide on a guidance ramp which is arranged so that said sealing member moves away from said supporting pipe when it is displaced towards said sealing position.

20. The sealing device according to claim 16, wherein in the sealing position of a said sealing set, several of the sealing members form a generally tapered arrangement, said sealing members having a length which is greater than a radial length of said inter-pipe space.

21. The sealing device according to claim 20, wherein in said sealing position, several sealing members overlap and cover each other in a significantly fluid-tight manner.

22. The sealing device according to claim 16, wherein at least one said sealing member is arranged so that its displacement to said sealing positions is performed at least partly thanks to the pressure exerted on said sealing member by a fluid circulating in at least one of said first and second pipes.

23. The sealing device according to claim 16, comprising two said sealing sets substantially identical and spaced from one another in the longitudinal direction.

24. The sealing device according to claim 16, wherein in said guard positions said sealing members are prevented to be displaced towards said sealing position thanks to a retaining device which comprises at least one retaining member surrounding at least one said sealing set, said retaining device further comprising releasing means able to release said retaining member so as to allow said sealing member to be displaced towards said sealing position.

25. A telescopic connection module, comprising an enclosure and a telescopic tube in communication with an inner space of said enclosure, said telescopic tube being movable in translation between a rearward position and a forward position and comprising a front portion provided with a sealing device according to claim 16.

* * * * *